(No Model.)
W. B. MARBLE.
TONGS.
No. 582,755. Patented May 18, 1897.
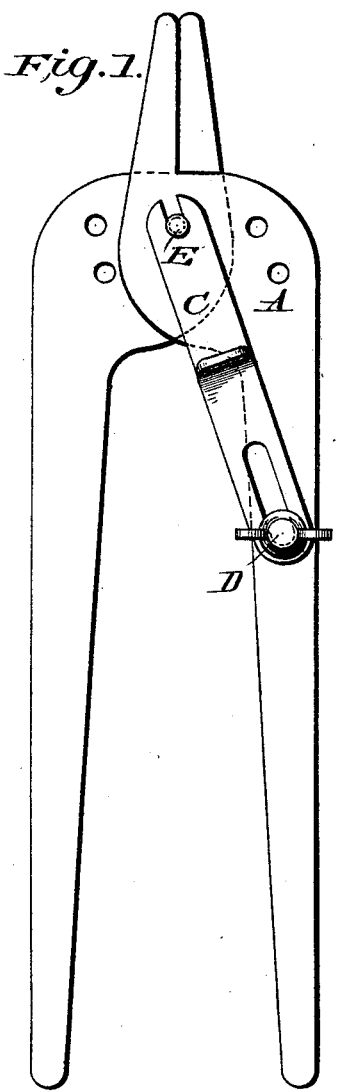
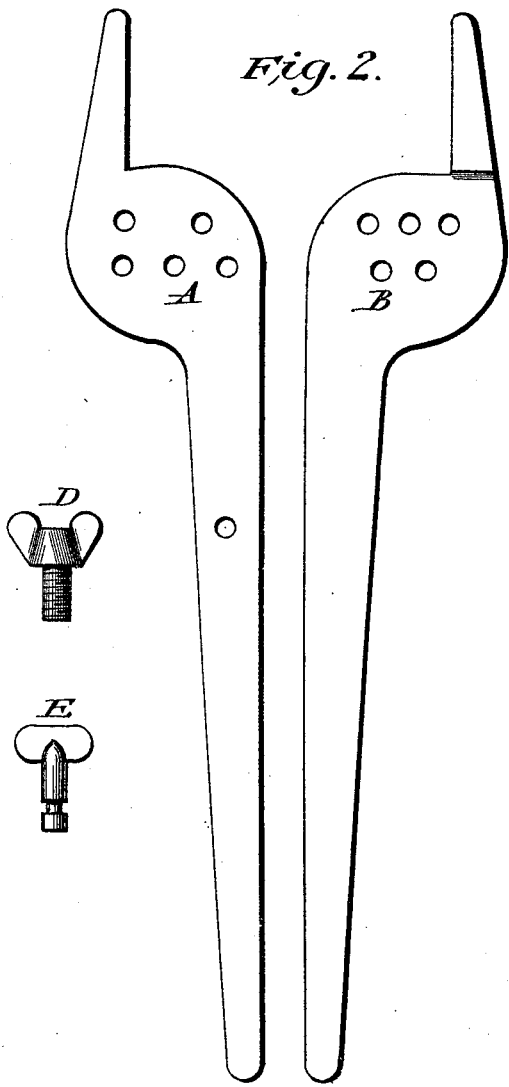
Witnesses.
C. W. Morrison
D. R. Snyder
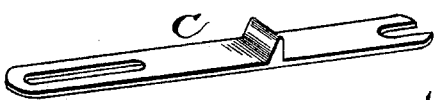
Inventor.
Walter Brown Marble

UNITED STATES PATENT OFFICE.

WALTER BROWN MARBLE, OF LAYTONVILLE, CALIFORNIA.

TONGS.

SPECIFICATION forming part of Letters Patent No. 582,755, dated May 18, 1897.

Application filed July 20, 1896. Serial No. 599,971. (No model.)

*To all whom it may concern:*

Be it known that I, WALTER BROWN MARBLE, a citizen of the United States, residing at Laytonville, in the county of Mendocino and State of California, have invented a new and useful Blacksmith's Tongs, of which the following is a specification, reference being had to the accompanying drawings.

Figure 1 is a vertical elevation of the entire tongs coupled at the smallest adjustment. Fig. 2 is a view of the tongs taken apart.

In Fig. 2 jaws A and B show the holes for adjusting.

C is a plate with a slot-hole in one end and a raised place on its surface to slide on the handle of the jaw A.

D is a thumb-screw to fasten the plate C in place by passing through the slot-hole in the plate C and a hole in the handle of the jaw A.

E is a removable pin with a crease cut around it, which is inserted through corresponding holes in the jaws A and B and held in place by the sliding plate C, which is pushed forward until the half-circle in the end of the plate C fits around the crease in the end of the pin E. This couples the jaws A and B together, and the tongs are ready for use.

My tongs are adjustable from closed to any size desired to hold different-sized articles by any holes in the jaws A and B to make the desired adjustment.

To adjust the tool, take the tongs as they appear in Fig. 1 in the left hand, place the index-finger on the head of the pin E, place the thumb on the raised place in the center of the plate C, with the right hand loosen the thumb-screw D, press back on the plate C until the pin E can be removed, slide the jaws A and B apart to size desired, insert the pin E through corresponding holes in the jaws A and B, press the plate C forward until the half-circle hole in the end of the plate C fits around the crease in the pin E, tighten the thumb-screw D, and the tongs are ready for use.

What I claim as my invention, and desire to secure by Letters Patent, is—

In a pair of tongs, a pair of jaws, having each a handle, and a series of openings, for an adjustable pivot, a pivot-pin provided with a retaining-groove, a set-screw seated in one of the handles, and a slotted keeper-plate adjustably held by the set-screw and engaging the groove in the pivot-pin as set forth.

WALTER BROWN MARBLE.

Witnesses:
 H. W. SHUTLER,
 JAS. PURDY.